United States Patent
Kim et al.

(10) Patent No.: US 8,368,867 B2
(45) Date of Patent: Feb. 5, 2013

(54) LIQUID CRYSTAL SPRAYING APPARATUS WITH ULTRASONIC CONVERTER WITHIN NOZZLE AND METHOD FOR MANUFACTURING OF LIQUID CRYSTAL DISPLAY DEVICE USING THE SAME

(75) Inventors: Kang Suk Kim, Seongnam-si (KR); Tae Joon Song, Suwon-si (KR)

(73) Assignee: LG Display Co., Ltd., Seoul (KR)

( * ) Notice: Subject to any disclaimer, the term of this patent is extended or adjusted under 35 U.S.C. 154(b) by 990 days.

(21) Appl. No.: 11/283,759

(22) Filed: Nov. 22, 2005

(65) Prior Publication Data

US 2006/0164589 A1    Jul. 27, 2006

(30) Foreign Application Priority Data

Dec. 31, 2004  (KR) .................. 10-2004-0118377
Aug. 8, 2005   (KR) .................. 10-2005-0072339

(51) Int. Cl.
  *G02F 1/1341*  (2006.01)
  *G02F 1/1339*  (2006.01)
(52) U.S. Cl. ...................... 349/189; 349/154
(58) Field of Classification Search .......... 349/154, 349/189
  See application file for complete search history.

(56) References Cited

U.S. PATENT DOCUMENTS

| | | | |
|---|---|---|---|
| 5,278,626 A * | 1/1994 | Poole et al. | 356/36 |
| 6,150,478 A * | 11/2000 | Ramamurthy et al. | 526/88 |
| 6,478,754 B1 * | 11/2002 | Babaev | 601/2 |
| 6,997,216 B2 * | 2/2006 | Ryu et al. | 141/67 |
| 7,258,894 B2 * | 8/2007 | Kim et al. | 427/162 |
| 2004/0207797 A1 * | 10/2004 | Sakurada | 349/153 |
| 2004/0234690 A1 * | 11/2004 | Hiruma | 427/256 |
| 2004/0261894 A1 * | 12/2004 | Ryu et al. | 141/94 |
| 2005/0018125 A1 * | 1/2005 | Hiruma | 349/189 |
| 2005/0035213 A1 * | 2/2005 | Erickson et al. | 239/102.1 |

FOREIGN PATENT DOCUMENTS

| | | | |
|---|---|---|---|
| JP | 03-033824 | | 2/1991 |
| JP | 03-078728 | | 4/1991 |
| JP | 11033458 A | * | 2/1999 |
| JP | 2001-272640 | | 10/2001 |
| JP | 2002-311442 | | 10/2002 |
| JP | 09-000994 | | 1/2003 |
| JP | 2003-001160 | | 1/2003 |

* cited by examiner

*Primary Examiner* — Hoan C Nguyen

(74) *Attorney, Agent, or Firm* — McKenna, Long and Aldridge, LLP.

(57) ABSTRACT

A liquid crystal spraying apparatus is provided. In the apparatus, a liquid crystal vessel stores liquid crystal. A liquid crystal nozzle sprays the stored liquid crystal in the form of fine particles. A liquid crystal supplier supplies the stored liquid crystal to the liquid crystal nozzle. A gas supplier supplies gas causing the supplied liquid crystal to be sprayed in the form of fine particles. A gas tank supplies the gas to the gas supplier.

8 Claims, 7 Drawing Sheets

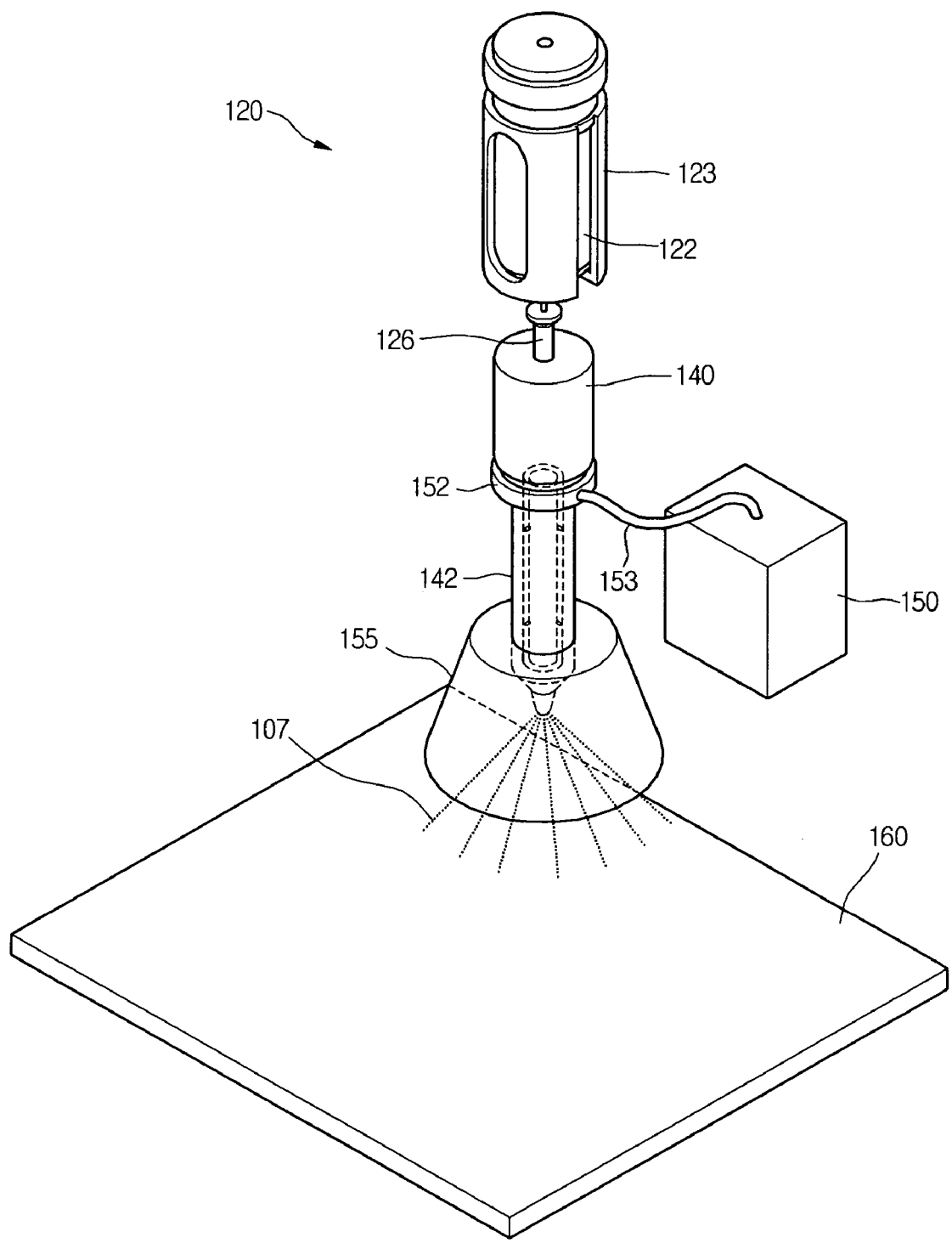

LIQUID CRYSTAL INJECTION

GAS INJECTION    GAS INJECTION

LIQUID CRYSTAL SPRAYING APPARATUS WITH ULTRASONIC CONVERTER WITHIN NOZZLE AND METHOD FOR MANUFACTURING OF LIQUID CRYSTAL DISPLAY DEVICE USING THE SAME

This application claims the benefit of Korean Patent Application Nos. 2004-118377, filed on Dec. 31, 2004, and 2005-72339, filed on Aug. 8, 2005, which is hereby incorporated by reference for all purposes as if fully set forth herein.

BACKGROUND OF THE INVENTION

1. Field of the Invention

The present invention relates to a liquid crystal display (LCD) device and a method for fabricating an LCD device, and more particularly, to a liquid crystal spraying apparatus that can uniformly dispense liquid crystal to improve the image quality of the LCD device.

2. Discussion of the Related Art

With the development of various portable electronic devices such as mobile phones, PDAs (personal digital assistant), notebook computers, and the like, the demand for flat panel display devices (that are thin, small and lightweight) has recently increased. Various display devices, such as liquid crystal display (LCD) devices, plasma display panels (PDP), field emission displays (FED), and vacuum fluorescent displays (VFD), have been actively studied for use as a flat panel display device. Among these various display devices, LCD devices are being spotlighted as the preferred flat panel display devices because of their simplicity in mass-production, facile driving method and high-resolution image.

An LCD device displays information on its screen by using refractive index anisotropy of liquid crystal. The LCD is generally constricted to include a lower substrate on which a thin film transistor (TFT) and a pixel electrode are formed, an upper substrate on which a color filter layer is formed, and a liquid crystal layer interposed between the lower and upper substrates.

A method for fabricating an LCD device is divided into an array substrate forming process for forming a lower substrate, a color filter substrate forming process for forming an upper substrate, and a cell process. These processes will now be described with reference to FIG. 1.

FIG. 1 is a flowchart illustrating a method for fabricating an LCD device according to the related art.

Referring to FIG. 1, a plurality of gate lines and data lines defining a plurality of pixel regions are formed on a lower substrate, and a TFT, which is a driving device connected to the gate line and the data line, is formed in each pixel region (S101) through the array substrate forming process. A pixel electrode is also formed through the array substrate forming process, which is connected to the TFT and drives a liquid crystal layer according to a signal applied thereto via the data line.

An R/G/B color filter layer and a common electrode are formed on a upper substrate (S104) through the color filter substrate forming process.

Thereafter, alignment layers are respectively coated on the upper and lower substrates, and then the coated alignment layers are rubbed to provide an anchoring force or surface force (that is, a pretilt angle or an alignment direction) to the molecules of a liquid crystal layer to be formed between the upper and lower substrates (S102, S105).

Thereafter, spacers are dispersed on the lower substrate to maintain a constant cell gap, a sealant is coated on an outer portion of the upper substrate, and then the upper and lower substrates are pressed together (S103, S106, S107).

Large-size glass substrates are generally used for the upper and lower substrates. Because a plurality of liquid crystal panel regions are formed on the large-size glass substrates and a TFT and a color filter layer are formed on each of the liquid crystal panel regions, the assembled substrates should be cut and processed to fabricate a plurality of liquid crystal panels (S108).

Thereafter, a liquid crystal layer is formed in each of the liquid crystal panels by injecting liquid crystal into the liquid crystal panel through a liquid crystal injection hole thereof and sealing the liquid crystal injection hole. The injection is achieved by a pressure difference between a vacuum chamber 10 and the liquid crystal panel 11 (see FIG. 2). The method for fabricating an LCD panel is completed by inspecting the liquid crystal panel (S109, S110).

FIG. 2 is a schematic view illustrating an apparatus for injecting liquid crystal into a liquid crystal panel according to the related art.

Referring to FIG. 2, a vessel 12 filled with liquid crystal 14 is provided in a vacuum chamber 10, and a liquid crystal panel 11 is positioned over the vessel 12. The vacuum chamber 10 is connected to a vacuum pump, and thus the inside of the vacuum chamber 10 is maintained at a set level of vacuum when liquid crystal is injected into the liquid crystal panel 11. Also, a moving unit (not shown) is installed in the vacuum chamber 10, which brings an injection hole 16 at the bottom of the liquid crystal panel 11 into contact with the liquid crystal 14 in the vessel 12 by moving the liquid crystal panel 11 down from a higher position. This method is called a vacuum/dipping injection method.

The degree of vacuum in the vacuum chamber 10 is reduced by supplying nitrogen gas into the vacuum chamber 10 while the injection hole 16 is in contact with the liquid crystal 14. The liquid crystal 14 is then injected through the injection hole 16 into the liquid panel 11 by means of a pressure difference between the inside of the liquid crystal panel 11 and the vacuum chamber 10. The method for forming a liquid crystal layer in the liquid crystal panel 11 is completed by sealing the injection hole 16 with a sealant after completing the injection of the liquid crystal 14 into the liquid crystal panel 11.

However, the method of forming the liquid crystal layer by injecting liquid crystal 14 into the liquid crystal panel 11 in the vacuum chamber 10 has the following problems.

First, the process time for injecting liquid crystal 14 into the liquid crystal panel 11 is long. In general, because a cell gap between the array substrate and the color filter substrate in a liquid crystal panel is very small (about several μm), a very small amount of liquid crystal is injected into the liquid crystal panel per unit time. For example, about 8 hours are required to complete the injection of liquid crystal into a 15-inch liquid crystal panel. The long injection time decreases productivity (or yield).

Second, a large portion of the liquid crystal 14 used for the liquid crystal injection process is discarded. That is, only a very small amount of the liquid crystal 14 in the vessel 12 is actually injected into the liquid crystal panel 11. Because the liquid crystal 14 can be degraded by the impurities in the injection apparatus and the gases used as well as by the impurities generated when the liquid crystal 14 comes into contact with the liquid crystal panel 11, the remaining liquid crystal 14 in the vessel 12 after dipping a single liquid crystal panel 11 should be discarded and may not be used for other liquid crystal panels. This increases fabrication costs.

SUMMARY OF THE INVENTION

Accordingly, the present invention is directed to a liquid crystal display and method for fabricating the same that substantially obviate one or more problems due to limitations and disadvantages of the related art.

An advantage of the present invention is to provide a liquid crystal spraying apparatus that can minimize defective unevenness generated during a liquid crystal injection process by directly spraying liquid crystal on a glass substrate.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a liquid crystal spraying apparatus includes a liquid crystal vessel for storing liquid crystal; a liquid crystal nozzle for spraying the stored liquid crystal in a form of fine particles; a liquid crystal supplier for supplying the stored liquid crystal to the liquid crystal nozzle; a gas supplier for supplying a gas to the liquid crystal nozzle; and a gas tank for supplying the gas to the gas supplier.

In another aspect of the present invention, a liquid crystal spraying apparatus includes a liquid crystal vessel for storing liquid crystal; a liquid crystal nozzle for spraying the stored liquid crystal in a form of fine particles; a liquid crystal supplier for supplying the stored liquid crystal to the liquid crystal nozzle; a ultrasonic converter for converting the supplied liquid crystal into fine particles; a power terminal connected to the ultrasonic converter; and a controller for applying a control signal to the power terminal.

In yet another aspect of the present invention, a method for fabricating a liquid crystal display (LCD) device includes providing a first substrate and a second substrate; spraying liquid crystal on the first substrate using a sprayer that includes a liquid crystal vessel and a nozzle, wherein the nozzle includes a means to convert the liquid crystal received from the liquid crystal vessel into a plurality of fine particles of the liquid crystal; and attaching the first and second substrates to each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings:

FIG. 4 is a perspective view of a liquid crystal spraying apparatus according to a first embodiment of the present invention;

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

Figure 1:
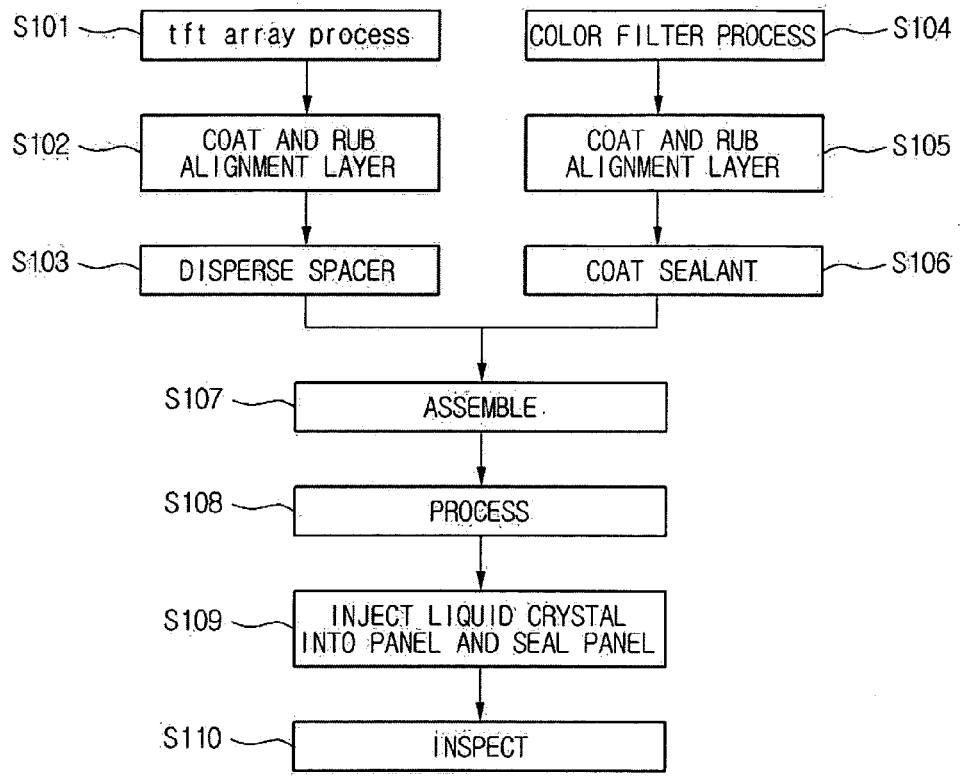
FIG. 1 is a flowchart illustrating a method for fabricating an LCD device according to the related art.
Figure 2:
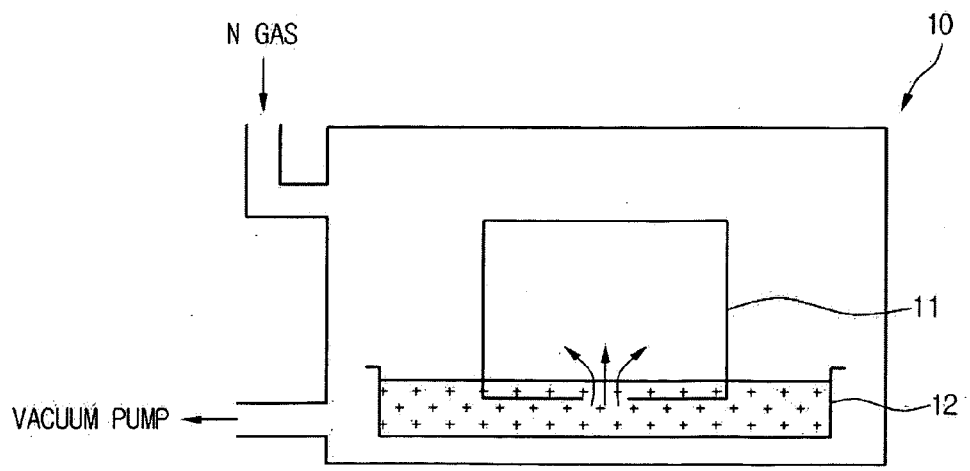
FIG. 2 is a schematic view illustrating an apparatus for injecting liquid crystal into a liquid crystal panel according to the related art.
Figure 3:
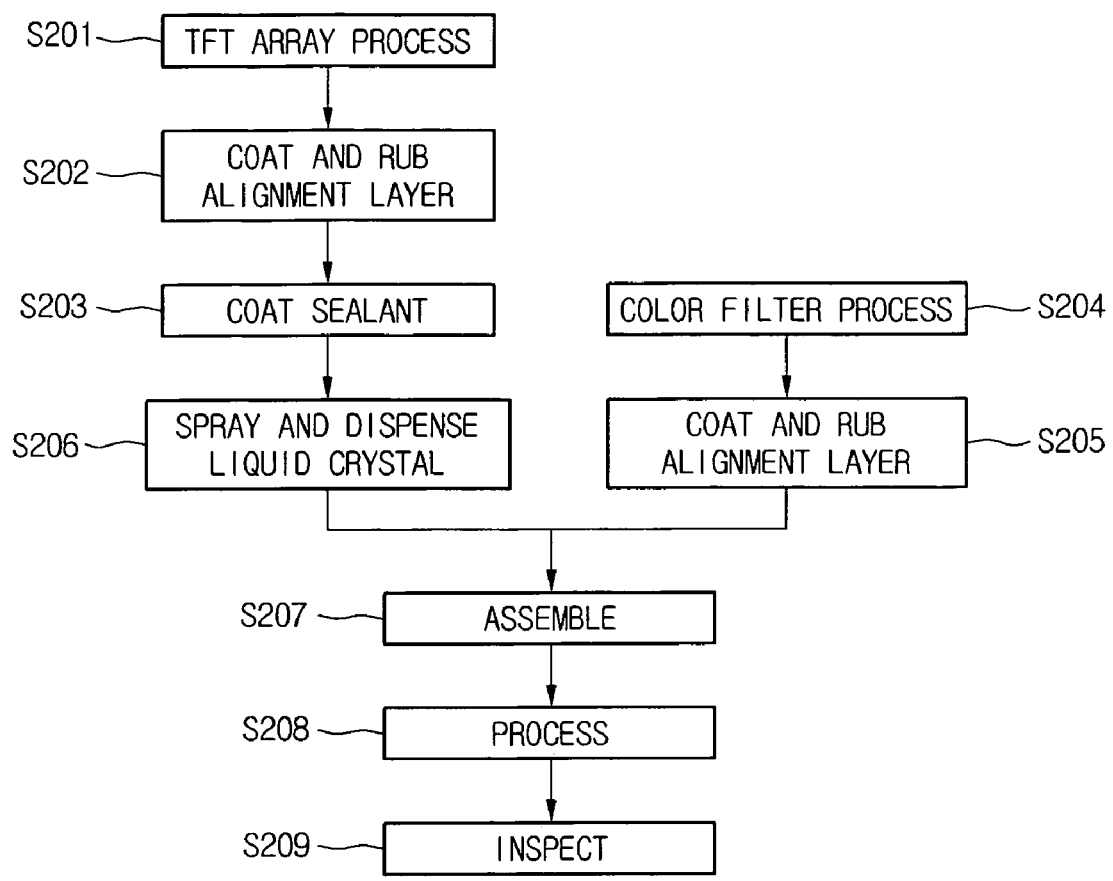
FIG. 3 is a flowchart illustrating a method for fabricating a liquid crystal display (LCD) device according to the present invention.

FIG. 3 is a flowchart illustrating a method for fabricating a liquid crystal display (LCD) device according to the present invention.

Referring to FIG. 3, a plurality of gate lines and data lines defining a plurality of pixel regions are formed on a lower substrate, and a TFT, which is a driving device connected to the gate line and the data line, is formed in each pixel region (S201) through an array substrate forming process. A pixel electrode is also formed through the array substrate forming process, which is connected to the TFT and drives a liquid crystal layer according to a signal applied via the data line.

An R/G/B color filter layer and a common electrode are formed on a upper substrate (S204) through a color filter substrate forming process.

Thereafter, an alignment layer is coated on each of the upper and lower substrates, and then the coated alignment layers are rubbed so as to provide an anchoring force or surface force (that is, a pretilt angle or an alignment direction) to the molecules of a liquid crystal layer to be formed between the upper and lower substrates (S202, S205).

Thereafter, seal patterns are formed on an outer portion of the lower substrate, and then liquid crystal is sprayed (or dispensed) on the lower substrate, and then the upper and lower substrates are pressed together (S203, S206, S207).

The above process is only exemplary and various modifications are possible according to the present invention. That is, the seal patterns may be formed on the upper substrate, not on the lower substrate. Additionally, the liquid crystal may be sprayed (or dispensed) on the upper substrate, not on the lower substrate.

For example, the seal patterns may be formed on the upper substrate and the liquid crystal may be sprayed (or dispensed) on the upper substrate. For another example, the seal patterns may be formed on the lower substrate and the liquid crystal may be sprayed (or dispensed) on the upper substrate.

In this example, the upper and lower substrates are large-size glass substrates. Because a plurality of liquid crystal panel regions are formed on the large-size glass substrates and a TFT and a color filter layer are formed on each of the liquid crystal panel regions, the assembled substrates should be cut and processed to fabricate a plurality of liquid crystal panels (S208). Thereafter, the method for fabricating an LCD panel is completed by inspecting each liquid crystal panel (S209).

A method of spraying (or dispensing) liquid crystal on one of the substrates will now be described in detail with reference to FIGS. 4 to 8.

FIG. 4 is a perspective view of a liquid crystal spraying apparatus according to a first embodiment of the present invention.

Referring to FIG. 4, the liquid crystal spraying apparatus 120 includes a liquid crystal vessel 122 is received in a case 123. The liquid crystal vessel 122 is made of polyethylene and filled with liquid crystal 107. Polyethylene is generally used as a material for the liquid crystal vessel 122 because it has a favorable plasticity and does not react with the liquid crystal 107. The case 123 is made of stainless steel.

A liquid crystal supplier 140 is disposed below the liquid crystal vessel 122 and they are connected to each other via a connection tube 126. A liquid crystal nozzle 142 for spraying the liquid crystal 107 is connected to the liquid crystal supplier 140. A gas supplier 152 for spraying the liquid crystal in the form of fine particles is connected to the connection region between the liquid crystal supplier 140 and the liquid crystal nozzle 142. The gas supplier 152 is connected to a gas tank 150 via a gas supply tube 153 to supply a gas in the gas tank to the liquid crystal nozzle 142. The gas in the gas tank 150 may be air, $N_2$ or $H_2$ or combination thereof. A guide 155 is connected to the liquid crystal nozzle 142 in such a way to spray the liquid crystal 107 only on a selected region of a substrate 160 and to prevent contamination of the apparatus 120 by the sprayed liquid crystal 107.

By the above structure, the liquid crystal 107 is supplied from the liquid crystal vessel 122 into the liquid crystal supplier 140 and is then sprayed onto the substrate 160 through the liquid crystal nozzle 142.

In order to disperse the liquid crystal 107 having a higher viscosity than water in the form of fine particles, the liquid crystal 107 is supplied to the liquid crystal nozzle 142, together with the gas stored in the gas tank 150. That is, the supplied gas causes the liquid crystal 107 to be dispersed and sprayed onto the substrate 160 through the liquid crystal nozzle 142 in the form of fine particles. Accordingly, the liquid crystal 107 can be uniformly coated on the substrate 160, thereby preventing a spot defect in the LCD device.

Also, the guide 155 connected to the liquid crystal nozzle 142 helps spray the liquid crystal 107 only on a selected region of the substrate 160 and prevent contamination of the apparatus 120 by the sprayed liquid crystal 107. Further, the amount of the liquid crystal dispensed on the substrate 160 can be conveniently measured after the supply of the gas to the liquid crystal nozzle 142 is stopped.

According to the dispensing method described above, because the liquid crystal 107 is coated on the substrate 160 in a thin and uniform manner, the process time for assembling the upper and lower substrates can be reduced. Also, when the liquid crystal 107 is sprayed, a damage to the alignment layer, which may be generated during the assembly process of the upper and lower substrates, can be minimized. Accordingly, the production yield and image quality of the LCD device can be improved.

Figure 5A:
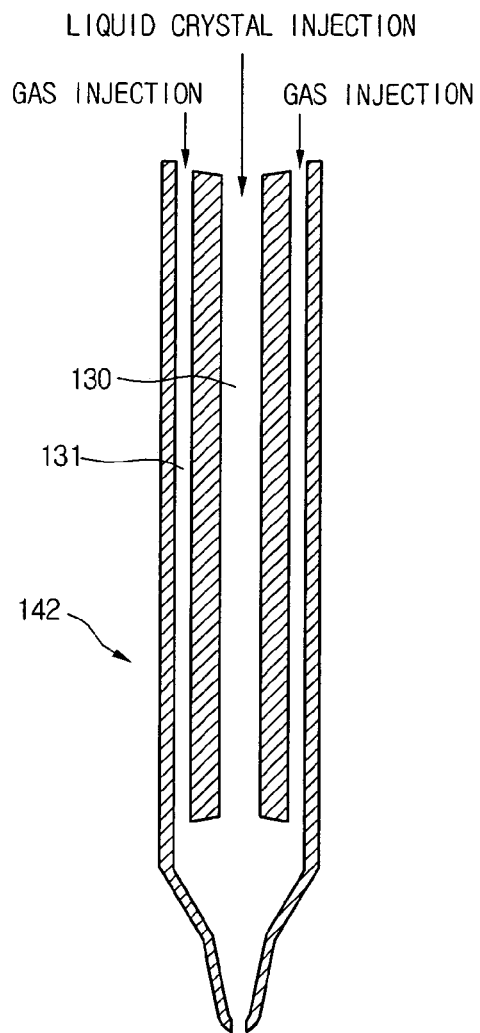
FIG. 5A is a sectional view of a liquid crystal nozzle illustrated in FIG. 4.
Figure 5B:
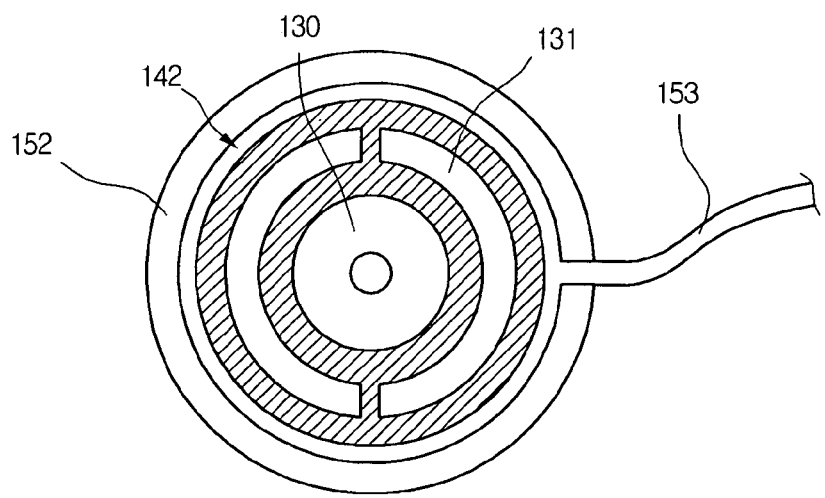
FIG. 5B is a sectional view illustrating a connection region between the liquid crystal nozzle and a gas supplier illustrated in FIG. 4.

FIG. 5A is a cross-sectional view of the liquid crystal nozzle 142, and FIG. 5B is a sectional view illustrating a connection region between the liquid crystal nozzle 142 and the gas supplier 152.

Referring to FIGS. 5A and 5B, a liquid crystal injection hole 130 and a gas injection hole 131 are formed in the liquid crystal nozzle 142. The liquid crystal 107 flows through the liquid crystal injections hole 130 and is then dispersed in the form of fine particles due to the gas flown through the gas injection hole 131. The liquid crystal 107 having a high viscosity is sprayed in the form of fine particles by supplying the gas (air, $N_2$, $H_2$, or combination thereof etc) through the gas injection hole 131 while injecting the liquid crystal 107 through the liquid crystal injection hole 130 by a predetermined pressure. Accordingly, the size and number of the sprayed liquid crystal particles can be adjusted according to the pressure of the gas supplied through the gas injection hole 131.

The gas supplier 152 is connected to the liquid crystal nozzle 142 to inject the gas from the gas supply tube 153 into the gas injection hole 131 of the liquid crystal nozzle 142. The injected gas passes through the gas injection hole 131 and is then mixed with the liquid crystal 107 injected through the liquid crystal injection hole 130, thereby spraying the liquid crystal 107 in the form of fine particles.

Figure 6:
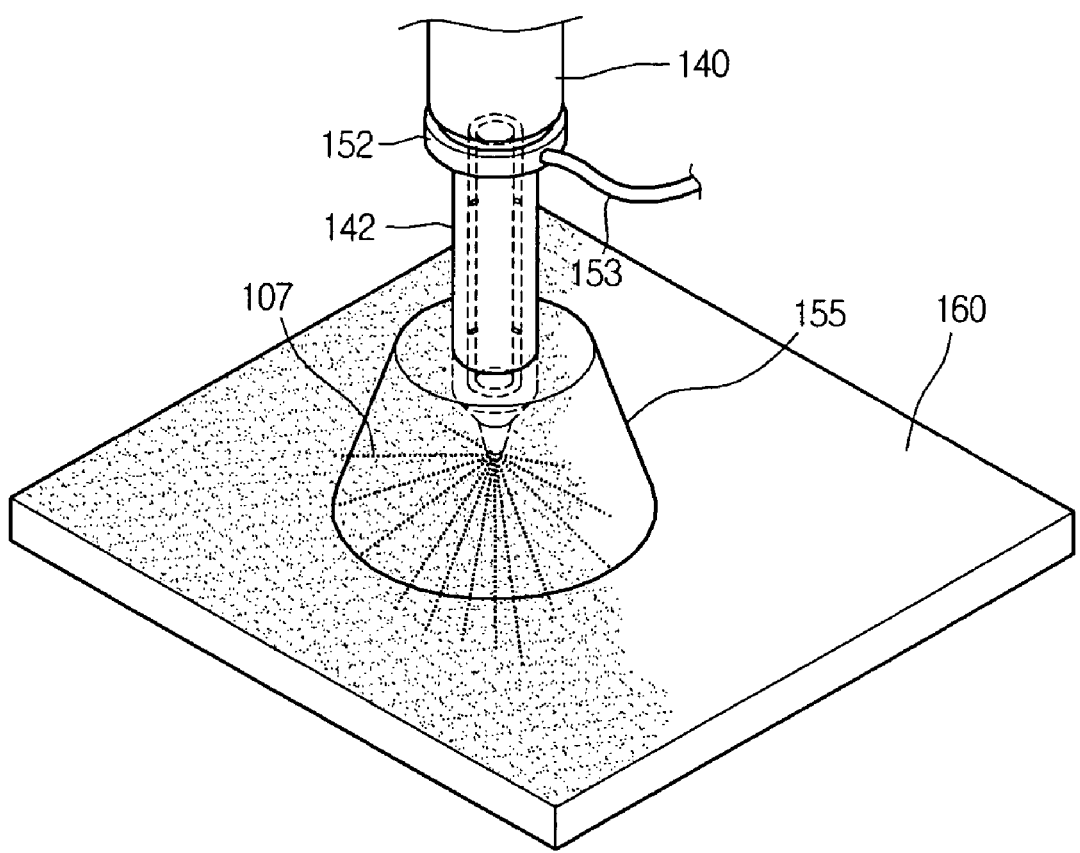
FIG. 6 is a schematic view illustrating a method for dispensing liquid crystal on a substrate using the liquid crystal spraying apparatus according to the first embodiment of the present invention.

FIG. 6 is a schematic view illustrating a method for dispensing liquid crystal on a substrate using the liquid crystal spraying apparatus 120.

Referring to FIG. 6, the liquid crystal spraying apparatus 120 is installed over a substrate 160. Although not shown in the drawings, the liquid crystal spraying apparatus 120 is filled with liquid crystal 107, and can spray the liquid crystal 107 on the substrate 160 with a uniform quantity.

The liquid crystal spraying apparatus 120 includes the liquid crystal supplier 140 and the liquid crystal nozzle 142. Fine liquid crystal particles sprayed from the liquid crystal nozzle 142 are uniformly coated on the substrate 160. The liquid crystal 107 sprayed through the liquid crystal nozzle 142 is coated on the substrate 160 in the form of fine particles. The gas supplier 152 is connected between the liquid crystal supplier 140 and the liquid crystal nozzle 142 to supply the gas received through the gas supply tube 153 to the liquid crystal nozzle 142.

The substrate 160 moves in the x or y direction at a predetermined speed, and the liquid crystal spraying apparatus 120 continuously sprays the liquid crystal 107 during a predetermined time period. Accordingly, the liquid crystal 107 is uniformly sprayed and coated on a surface of the substrate 160. The liquid crystal 107 may be sprayed by moving only the liquid crystal spraying apparatus 120 in the x or y direction without moving the substrate 160.

Figure 7:
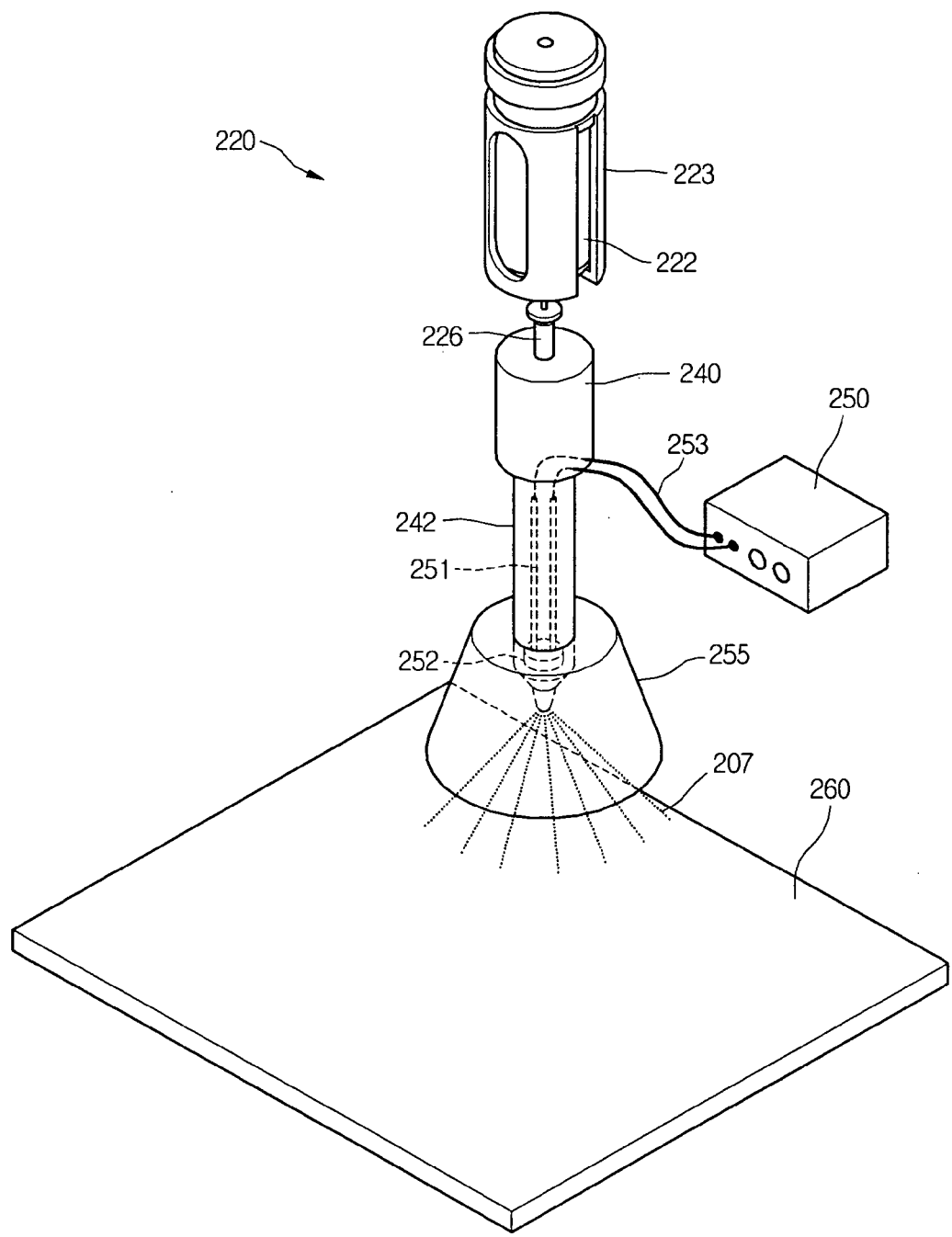
FIG. 7 is a view illustrating a liquid crystal spraying apparatus according to a second embodiment of the present invention.

FIG. 7 is a view illustrating a liquid crystal spraying apparatus according to a second embodiment of the present invention.

Referring to FIG. 7, the liquid crystal spraying apparatus 220 includes a liquid crystal vessel 222 for storing liquid crystal 207 that is received in a case 223 and connected to a liquid crystal supplier 240 via a connection tube 226. The liquid crystal supplier 240 is directly connected to a liquid crystal nozzle 242 to spray the liquid crystal 207 through the liquid crystal nozzle 242 by a predetermined pressure.

A ultrasonic converter 252 for converting the liquid crystal 207 into fine particles, and power terminals 251 connected to the ultrasonic converter 252 are installed in the liquid crystal nozzle 242. A controller 250 is connected to the power terminals 251 through cables 253 to apply a predetermined control signal to the power terminals 251. The controller 250, the power terminals 251, the ultrasonic converter 252, and the cables 253 may constitute a ultrasonic generator.

A guide 255 is connected to the liquid crystal nozzle 242 in such a way to spray the liquid crystal 207 only on a selected region of a substrate 260 and to prevent contamination of the apparatus 220 by the sprayed liquid crystal 207.

By the above structure, the liquid crystal 207 is received from the liquid crystal supplier 240 into the liquid crystal nozzle 242 and is then converted into fine particles by the vibration energy of the ultrasonic converter 252. Accordingly, the liquid crystal 207 is sprayed on the substrate 260 in the form of fine particles.

The conversion of the liquid crystal 207 into fine particles by the ultrasonic converter 252 will be described below.

When the liquid crystal 207 is supplied from the liquid crystal supplier 240 to the liquid crystal nozzle 242, the ultrasonic converter 252 vibrates in response to the control signal from the controller 250. When the ultrasonic converter 252 vibrates, a liquid film of the liquid crystal 207 absorbs the vibration energy of the ultrasonic converter 252 and thus a predetermined stationary wave is generated on the liquid film. This stationary wave is called a capillary wave. When the threshold amplitude of the stationary wave exceeds the stability limit of the capillary wave, the stationary wave is distorted and thus the liquid crystal 207 is converted into fine particles. These liquid crystal particles are sprayed onto the substrate 260. The sprayed liquid crystal particles have a small kinetic energy. Accordingly, the alignment layer is not damaged and the dispensed amount of the liquid crystal 207 can be finely adjusted.

As described above, the liquid crystal 207 can be uniformly coated on the substrate 260 in the form of fine particles, thereby preventing a spot defect in the LCD device. Also, because the liquid crystal 207 is coated on the substrate 260 in a thin and uniform manner, the process time for assembling the upper and lower substrates can be reduced. Further, the guide 255 connected to the liquid crystal nozzle 242 helps spray the liquid crystal 207 only on a selected region of the substrate 260 and prevent contamination of the apparatus 220 by the sprayed liquid crystal 207.

Figure 8:
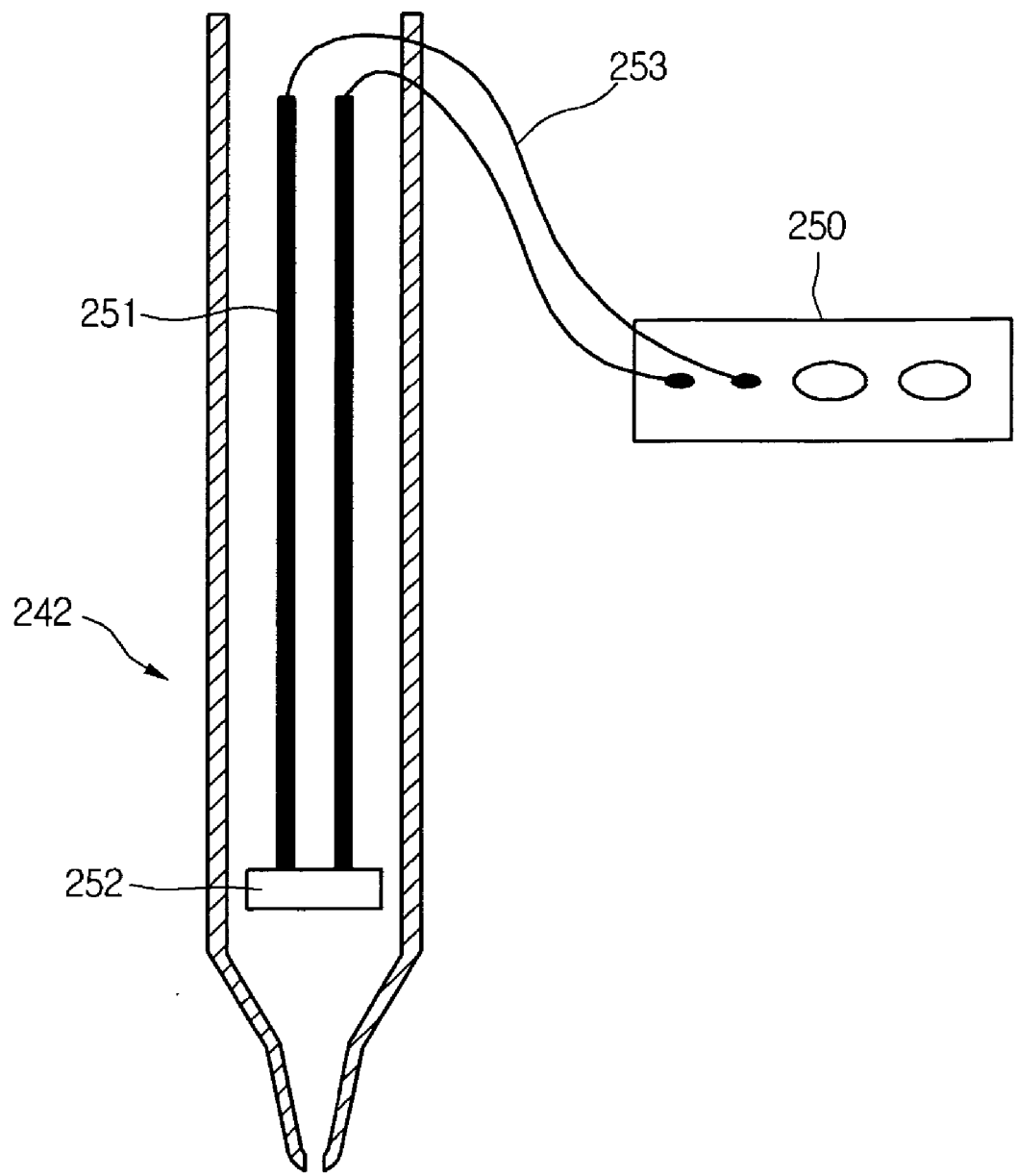
FIG. 8 is a sectional view of a liquid crystal nozzle illustrated in FIG. 7.

FIG. 8 is a sectional view of the liquid crystal nozzle 242.

Referring to FIG. 8, the ultrasonic converter 252 is installed in the liquid crystal nozzle 242. The power terminals 251 are connected to the ultrasonic converter 252. The power terminals 251 are connected to the controller 250 through the cable 253. The ultrasonic converter 252 vibrates when the control signal from the controller 250 is applied thereto. The vibrating ultrasonic converter 252 causes a predetermined wave to occur on a surface of the liquid crystal 207, thereby converting the liquid crystal 207 into fine particles.

The size of the sprayed liquid crystal particle can be adjusted according to the control signal from the controller 250. For example, the size of the liquid crystal particle can be adjusted by controlling the vibration frequency of the ultrasonic converter 252. Also, the amount of the liquid crystal sprayed on the substrate 260 can be conveniently measured after the ultrasonic generator is turned off.

As described above, a liquid crystal spraying apparatus according to the present invention uniformly sprays liquid crystal on a substrate, thereby minimizing or preventing a spot defect and a damage on the alignment layers that may be caused by the pressurized assembly of two substrates in the LCD device. Also, because the substrate and the liquid crystal spraying apparatus can be variously disposed when the liquid crystal is sprayed (or dispensed) on the substrate, the size of the liquid crystal spraying apparatus can be reduced. Further, the process time for dispensing the liquid crystal can be reduced, thereby enhancing production yield. Moreover, because a defect caused by bubbles that may be contained in the liquid crystal can be minimized, the liquid crystal can be more uniformly coated on the substrate.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for fabricating a liquid crystal display (LCD) device, comprising:
   providing a first substrate and a second substrate;
   spraying liquid crystal on the first substrate using a sprayer that includes a liquid crystal vessel received in a case and a nozzle, wherein the nozzle includes a means to convert the liquid crystal received from the liquid crystal vessel into a plurality of fine particles of the liquid crystal; and
   attaching the first and second substrates to each other,
   wherein the nozzle is directly connected to a guide to spray the liquid crystal at a selective region on the first substrate,
   wherein the guide is formed a shape of cap,
   wherein an end portion of the nozzle is distant from an end portion of the guide,
   wherein the liquid crystal vessel is made of polyethylene and the case is made of stainless steel,
   wherein a top surface of the guide is directly in contact with a side the of the nozzle,
   wherein the means is a ultrasonic converter and a power terminal connected with the ultrasonic converter,
   wherein the ultrasonic converter and the power terminal are disposed in the nozzle to separate the liquid crystal into fine particles by a distortion of a stationary wave on the liquid crystal within the nozzle,
   wherein the ultrasonic converter is disposed in the edge of the nozzle spraying the liquid crystal, and
   wherein the distortion of the stationary wave on the liquid crystal and a structure of the end of the nozzle are such that the fine particles of the liquid crystal are sprayed in a plurality of oblique directions and coated on the first substrate in a thin and uniform manner.

2. The method according to claim 1, wherein said means is a gas injection hole supplied with a gas.

3. The method according to claim 2, wherein a size of the fine particles is adjusted according to a pressure of the gas.

4. The method according to claim 2, wherein the gas is one of air, $N_2$ and $H_2$ or combination thereof.

5. The method according to claim 2, wherein the nozzle further includes a liquid crystal injection hole to receive the liquid crystal from the liquid crystal vessel.

6. The method according to claim 1, wherein a size of the fine particles is adjusted according to a vibration frequency of the ultrasonic converter.

7. The method according to claim 1, wherein the vibration frequency of the ultrasonic converter is controlled by a controller.

8. The method according to claim 1, wherein the power terminal of the ultrasonic converter is connected to a controller through a cable.

* * * * *